United States Patent Office 3,407,148
Patented Oct. 22, 1968

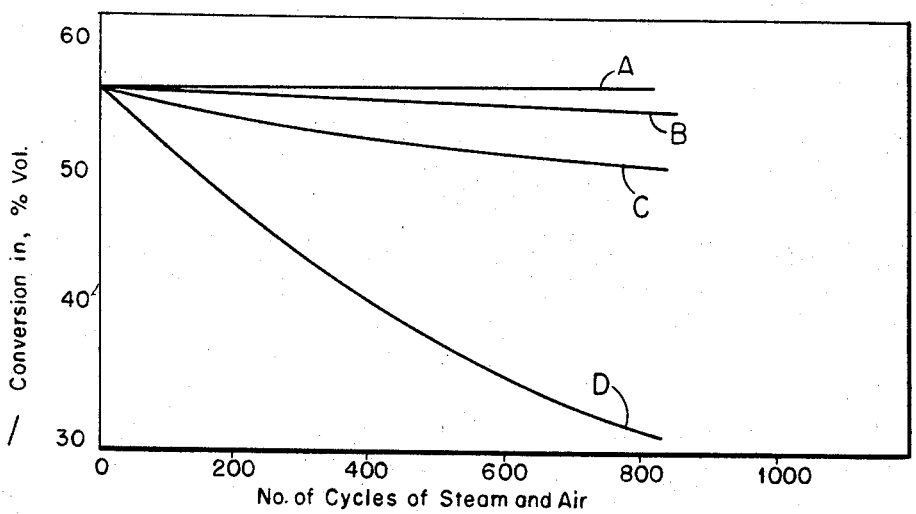
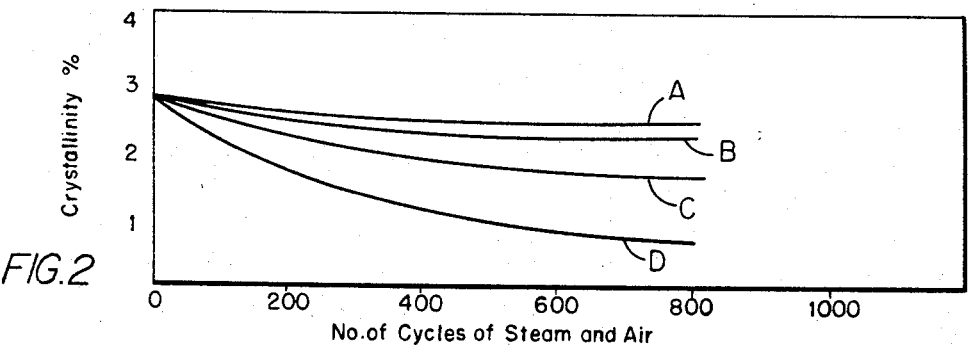
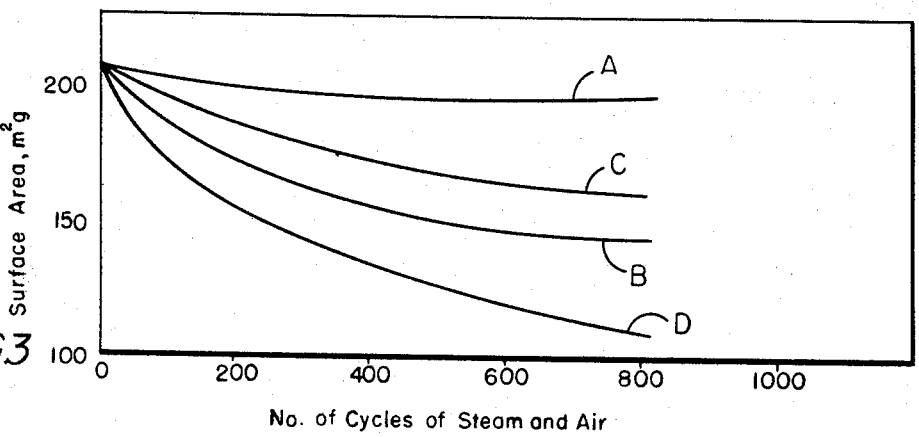

3,407,148
MINIMIZING DEACTIVATION OF ALUMINO-
SILICATE CATALYSTS DUE TO CHANGES
IN HYDRATION LEVEL
Sylvander C. Eastwood, Woodbury, and Stephen M. Oleck,
Moorestown, N.J., and Albert B. Schwartz, Philadelphia,
Pa., assignors to Mobil Oil Corporation, a corporation
of New York
Continuation-in-part of application Ser. No. 380,877,
July 7, 1964. This application Feb. 24, 1967, Ser.
No. 632,862
10 Claims. (Cl. 252—455)

ABSTRACT OF THE DISCLOSURE

Deactivation of aluminosilicate catalysts caused by cyclic hydration and dehydration in different atmospheric phases of a catalytic process is minimized and substantially eliminated by adjusting the moisture level of the various atmospheres contacting the catalyst in an amount sufficient to minimize change in the hydration level of the catalyst employed therein.

This is a continuation-in-part of application Ser. No. 380,877 filed July 7, 1964, and now abandoned.

BACKGROUND OF INVENTION

In several commercial processes in which crystalline aluminosilicate catalysts are employed, the catalysts are subjected to cyclic contact with atmospheres containing high and low partial pressures of steam. For example, in cracking of hydrocarbons by TCC operation, the catalysts may contact a steam-laden atmosphere in the seal leg above the reactor and contact air substantially free of moisture in the bottom of the kiln during regeneration of the catalyst. It has been found that such cyclic hydration and dehydration causes deactivation of the aluminosilicate catalyst over extended periods of operation. Advantageously, the process of this invention reduces or substantially eliminates such deactivation and promotes extended periods of high activity for the aluminosilicate catalyst during cyclic processes.

SUMMARY OF INVENTION

This invention contemplates a process for preventing deactivation of aluminosilicate catalysts by reducing fluctuations in the moisture content of the different atmospheres which contact the catalysts during cyclic operation of a catalytic process. More particularly, this invention is directed to a process for using crystalline aluminosilicates in catalytic processes in which the catalyst is maintained in either a hydrated or dehydrated state.

In accordance with this invention, it has been found that the deactivation of aluminosilicate catalysts caused by cyclic hydration and dehydration during different phases of a catalytic process can be minimized by reducing fluctuations between the hydration and dehydration states of the catalyst. Specifically, it has been found that injection of steam into such catalytic processes at the zones where dehydration may occur reduces deactivation of the catalyst and causes the catalyst to retain its catalytic activity over extended periods of cyclic operations. In addition, it has also been found that maintaining the catalysts in a fairly constant level of hydration, as for instance low hydration by use of an atmosphere of controlled moisture content also prevents deactivation of aluminosilicate for the prevailing period of cyclic operation. Also, many cyclic systems could be maintained at substantially any moisture level throughout as long as fairly constant, quite small changes of hydration in the aluminosilicate catalyst are maintained.

The effect of such treatments as described above is explained in examples herein and is shown graphically in the three figures of the drawings.

The process of this invention can find application in a variety of catalytic processes in which an aluminosilicate catalyst is subjected to cyclic hydration and dehydration during the process cycle. Exemplary of the catalytic processes in which aluminosilicates may be used as effective catalysts are polymerization of unsaturated hydrocarbons, dehydrogenation of dehydrogenatable organic compounds, the oxidation of organic compounds, the hydrogenation of organic compounds, the dehydration of alcohols, the alkylation of aromatic or isoparaffinic hydrocarbons, hydrocracking, isomerization, dealkylation, the cracking of hydrocarbons, and the like. It will be appreciated that in such catalytic processes the catalyst is often contacted in a cyclic manner with moisture-free atmospheres such as air or the like or with a moisture laden atmosphere such as one comprising a steam which respectively cause dehydration or hydration of the catalyst.

For example, in the cracking of hydrocarbons the catalyst is usually regenerated by contacting the catalyst with air or other oxygen-containing gas at an elevated temperature to remove carbonaceous residues such as coke and the like which accumulate on the catalyst during the cracking operation. In addition, the catalyst may also be contacted with steam in another part of the cycle. Thus, in using a fixed-bed reactor, the catalyst, for example, is first contacted with reactants for a given part of the operation cycle, then purged with steam to remove residual hydrocarbons, then contacted with air substantially moisture free to remove coke, and subsequently contacted with steam or some other moisture laden gas generally considered inert to purge the air from the catalyst prior to being placed back on stream for converting hydrocarbons. In TCC operations in which a moving-bed of catalyst in the reactor is employed, the catalyst is continuously removed from the reactor stripped of entrained hydrocarbons with steam and conducted to a regenerative kiln where it is contacted with air at an elevated temperature for a period sufficient to remove coke and the like from the catalyst. After regeneration, the catalyst is conveyed back to the reactor to effect the intended conversion. Steam alone or in conjunction with other seal gas is used to provide a gas seal which removes air from the catalysts and in addition also prevents gaseous reactants from escaping from the reactor through the seal leg during entry of the catalyst. In a fluidized bed operation, finely divided catalyst particles may be conveyed into the reactor with the incoming oil vapors combined with a diluent gas such as steam. The spent or used catalyst is removed from the reactor, stripped of hydrocarbons with steam or other suitable gas such as flue gas, and then the stripped catalyst is conveyed into a catalyst regenerator with an oxygen containing gas such as air. The atmosphere in the regenerator may be controlled to exert dehydration or hydration of the catalyst depending upon the moisture content of the regenerator atmosphere. While aluminosilicates are known to hydrate readily at room temperature in an atmosphere which contains moisture, it has also been found that they will hydrate at quite high temperatures in the presence of a proper concentration of moisture.

Also, it will be appreciated that the aluminosilicate catalyst may either be hydrated or dehydrated while in the reactor during the reaction cycle. In processes such as condensation of organic compounds, combustion of hydrocarbons, and the like, water may be formed as a product of the principal reaction. In other processes, water may be present in the reactants or products. Thus, it is apparent that many different atmospheric phases exist in a process cycle which may lead to cyclic hydration and dehydration of an aluminosilicate catalyst.

Furthermore, it will be appreciated that in such cyclic processes there may be a wide variation in the conditions of hydration and dehydration which may occur in different units of the process. Often regeneration with air may last for several minutes or even an hour or more at atmospheric pressure and temperatures of at least about 1000° F. or above, depending on the extent of coke accumulation in the catalyst. During such regeneration periods, the resulting state of hydration or dehydration of the catalyst is dependent in part on the temperatures, the amount of water in the air, and also on the length of time the catalyst is being contacted. For example, contacting with air or a like atmosphere containing about 1 volume percent (0.01 atmospheres partial pressure) water at higher temperatures (i.e. 1300° F.) for about 5 to 10 minutes tends to dehydrate the catalysts of which we are speaking.

Likewise, the state of hydration resulting from contact with steam is also dependent upon the temperatures, partial pressures of steam, and length of cycle devoted to this type of treatment. For example, contacting with steam at 1000° F., 15 p.s.i.g. (1.0 atmospheres) for 13 minutes will effect strong hydration of many aluminosilicates. Consequently, the degree of deactivation of an aluminosilicate catalyst resulting from cyclic hydration and dehydration is dependent upon the nature of the catalytic process as well as the particular aluminosilicate catalyst being employed.

In general, the greater the difference between zones of hydration and dehydration, the greater the deactivation of the aluminosilicate catalyst; that is, strong or a high degree of hydration followed by strong dehydration in the process cycle causes more deactivation of the catalyst than weak hydration followed by weak dehydration. Therefore, in accordance with this invention, deactivation of an aluminosilicate catalyst is prevented or substantially reduced by reducing fluctuations in the hydration or dehydration states of the catalyst.

Advantageously, in many catalytic processes, it has been found that deactivation of aluminosilicate catalysts caused by cyclic hydration and dehydration can be effectively minimized if the partial pressure of steam is held at preselected levels within the process cycle. For example, in TCC operation in which an aluminosilicate bead catalyst is contacted with air in a regenerative kiln at 1300° F. for 15–30 minutes and in a seal leg with steam at 1030° F. and at 15 p.s.i.g. for 13 minutes, injection of steam into the regenerative kiln effectively reduces deactivation of the catalyst. In general, at least about 3 percent by volume, (0.03 atmospheres) and preferably from about 5 percent (0.05 atmospheres) to about 30 percent (0.30 atmospheres) by volume of steam (based on atmospheric pressure), should be present in the kilns of a moving bed cracking unit, to prevent deactivation of the catalyst. It will be appreciated that an injection of steam is in addition to the amount of water in the atmospheric air and from other sources. Thus, in normal operation, the atmospheric air fed to a kiln may contain as much as (0.03 atmospheres) 3 percent by volume of water saturated at 80° F.) and could have as much as 4 percent (0.04 atmospheres) by volume of water added thereto resulting from combustion of fuel gas in the combustion air heater if the combustion air were preheated to 1000° F. Combustion of hydrogen-rich deposits may put additional moisture into the regeneration gases, and should be considered when controlling the total moisture in regenerator gases.

In addition, substitution of dry gas such as dry flue gas for a portion of or all of the steam used in the seal leg also affects the deactivation of the catalyst. Generally, use of a mixture containing at least about 30 percent dry gas in replacement of the steam will reduce deactivation of the catalyst, after the regeneration above outlined.

Various gases may be used to replace steam in a zone of hydration; selection of a specific gas will usually depend on the nature of the catalytic process. Exemplary of such gases are nitrogen, argon, flue gas, carbon dioxide, air, methane, natural gas, and the like.

The superactive catalytic materials employed in these processes are crystalline aluminosilicates which have been treated to confer upon them an enhanced catalytic conversion ability.

A typical aluminosilicate may be represented by the formula:

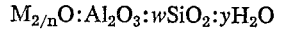

wherein M is a cation which balances the electrovalence of the crystalline structure, $n$ represents the valence of the cation, $w$ the moles of $SiO_2$, and $y$ the moles of $H_2O$. The cation can be one or more of a number of ions depending on whether the aluminosilicate is synthesized or occurs naturally. Typical cations include sodium, lithium, potassium, calcium, and the like. Although the proportions of inorganic oxides in the silicates and their spatial arrangement may vary, effecting distinct properties in the aluminosilicates, the two main characteristics of these materials are the presence in their molecular structure of at least 0.5 equivalents of an ion of positive valence per gram atom of aluminum, and an ability to undergo dehydration without substantially affecting the $SiO_4$ and $AlO_4$ framework.

Typical of such aluminosilicates are the commercial materials known as 13X, the sodium form of which may be represented as:

and Zeolite Y, the sodium form of which may be represented as:

wherein $w$ is a value greater than 3, and $x$ may be a value up to about 9. Both have the crystalline form of a faujasite. Other aluminosilicates of similar type, natural and synthetic, exist, and for catalytic conversion of hydrocarbons those ranging from pore sizes of 4 A. upward to 13 A., capable of accepting the usual spectrum of molecules present in a hydrocarbon charge stock, are selected.

Superactive aluminosilicate catalysts, suitable for use in the present invention can be prepared for example, from the sodium form of Zeolite X having a pore opening of about 10 A. This aluminosilicate is a commercially available zeolite, designated as Linde "13X." A particularly suitable catalyst is prepared by conventional base-exchanging, involving partial or complete replacement of the sodium of Zeolite X by contact with a fluid medium containing cations of one or more of the rare-earth metals. Any medium which will effect ion exchange without destroying the crystalline structure of the zeolite can be employed. After such a treatment, the resulting exchanged zeolite product is water-washed, dried, and dehydrated. The dehydration thereby produces the characteristic system of open pores, passages, or cavities of the crystalline aluminosilicates.

As a result of the above treatment, the rare-earth-exchanged aluminosilicate is an activated crystalline catalyst material in which the molecular structure has been changed by having rare-earth cations ionically bonded thereto. Because specific rare-earth metal cations, as well as a mixture of several different rare-earth metal cations, can be base-exchanged with the aluminosilicate, the concentration of cation sites produced within the catalyst can vary, depending on the completeness of the exchange as well as the rare-earth cations employed.

Advantageuosly, the rare-earth cations can be provided from the salt of a single metal or preferably mixtures of metals such as a rare-earth chloride or didymium chlorides. Such mixtures are usually introduced as a rare-earth chloride solution which, as used herein, has reference to a mixture of rare-earth chlorides consisting essentially of the chlorides of lanthanum, cerium, praseodymium, and neodymium, with minor amounts of samarium, gadolinium, and yttrium. This solution is commercially available and contains the chlorides of a rare-earth mixture having the relative composition cerium (as $CeO_2$), 48% by weight; lanthanum (as $La_2O_3$), 24% by weight; praseodymium (as $Pr_6O_{11}$), 5% by weight; neodymium (as $Nd_2O_3$), 17% by weight; samarium, 3% by weight; gadolinium (as $Gd_2O_3$), 2% by weight; yttrium (as $Y_2O_3$), 0.2% by weight; and other rare-earth oxides 0.8% by weight. Didymium chloride is also a mixture of rare-earth chlorides, but having a low cerium content. It consists of the following rare earths determined as oxides: lanthanum, 45–46% by weight; cerium, 1–2% by weight; praseodymium, 9–10% by weight; neodymium, 32–33% by weight; samarium, 5–6% by weight; gadolinium, 3–4% by weight; yttrium, 0.4% by weight; and other rare earths, 1–2% by weight. It is to be understood that other mixtures of rare earths are equally applicable in the instant invention.

Other active catalysts can be produced from Zeolite X by base exchange with both rare-earth cations and hydrogen ions or ions decomposable to hydrogen to replace the sodium cations from the aluminosilicate. This base exchange for example, can be accomplished by treatment with a fluid medium containing the rare-earth salts followed by another containing hydrogen ions or cations capable of conversion to hydrogen ions. Inorganic and organic acids represent the source of hydrogen ions, whereas ammonium compounds are representative of the compounds containing cations capable of conversion to hydrogen ions. It will be appreciated that this fluid medium can contain a hydrogen ion, an ammonium cation, or mixture thereof, and have a pH from about 4 to about 12.

Other active catalysts can be produced by ion exchanging the crystalline aluminosilicate with one or more other cations selected from the Groups II–A, III–B, VI–B, VII–B, VIII, I–B, II–B, III–A, IV–A of the Periodic Table and hydrogen ion or ions decomposable to hydrogen.

Other effective catalysts can be prepared from aluminosilicates such as Zeolites Y, L, T, D, offretite, chabazite, and mordenite. Also, exchange of rare-earth metals for the sodium cations within Zeolite Y produces a highly active catalyst in a manner similar to that described for preparation of the rare-earth exchanged Zeolite X. In addition, because of its high acid sability, Zeolite Y may be treated by partially replacing or replacing substantially all the sodium ions with hydrogen ions. This replacement can be accomplished by treatment with a fluid medium containing a hydrogen ion or an ion capable of conversion to a hydrogen ion (i.e., inorganic acids or ammonium compounds or mixture thereof).

The aluminosilicate catalyst may be employed directly as a catalyst or it may be combined with a suitable support or binder. It is necessary, however, that the support or binder employed be thermally stable under the conditions at which the conversion reaction is carried out. Thus, it is contemplated that solid porous adsorbents, carriers, and supports of the type heretofore employed in catalytic operations may be used in combination with the crystalline aluminosilicate. Such materials may be catalytically inert or may possess an intrinsic catalytic activity or an activity attributable to close association or reaction with the crystalline aluminosilicate. Such materials include, by way of example, dried inorganic oxide gels and gelatinous precipitates of alumina, silica, zirconia, magnesia, thoria, titania, boria, and combinations of these oxides with one another and with other components. Other suitable supports include activated charcoal, mullite, kieselguhr, bauxite, silicon carbide, sitered alumina, and various clays. These supported crystalline aluminosiilcates may be prepared by growing crystals of the aluminosilicate in the pores of the support. Also, the aluminosilicate may be intimately composited with a suitable binder, such as an inorganic oxide hydrogel or clay; for example, by ball milling the two materials together over an extended period of time, preferably in the presence of water, under conditions to reduce the particle size of the aluminosilicate to a weight mean particle diameter of less than 40 microns and preferably less than 15 microns. Also, the aluminosilicate may be combined with and distributed throughout a gel matrix by dispersing the aluminosilicate in powdered form in an inorganic oxide hydrosol. In accordance with this procedure, the finely divided aluminosilicate may be dispersed in an already prepared hydrosol or, as is preferable, where the hydrosol is characterized by a short time of gelation, the finely divided aluminosilicate may be added to one or more of the reactants used in forming the hydrosol or may be admixed in the form of a separate stream with streams of the hydrosol-forming reactants in a mixing nozzle or other means where the reactants are brought into intimate contact. The powder-containing inorganic oxide hydrosol sets to a hydrogel after lapse of a suitable period of time, and the resulting hydrogel may thereafter, if desired, be exchanged to introduce selected ions into the aluminosilicate and then dried and calcined.

The inorganic oxide gel employed, as described above, as a matrix for the metal aluminosilicate may be a gel of any hydrous inorganic oxide such as, for example, aluminous or siliceous gels. While alumina gel or silica gel may be utilized as a suitable matrix, it is preferred that the inorganic oxide gel employed be a cogel of silica and an oxide of at least one metal selected from the group consisting of metals of Groups II–A, III–A, III–B and IV–B of the Periodic Table. For example, silica-alumina, silica-magnesia, silica-zirconia, silica-thoria, silica-beryllia, silica-titania, as well as ternary combinations such as silica-alumina-thoria, silica-alumina-zirconia, silica-alumina-magnesia, and silica-magnesia-zirconia. In the foregoing gels, silica is generally present as the major component and the other oxides of metals are present in minor proportion. Thus, the silica content of such gels is generally within the approximate range of about 55 to about 100 weight percent, with the metal oxide content ranging from zero to 45 weight percent. The inorganic oxide hydrogels utilized herein and hydrogels obtained therefrom may be prepared by any method well known in the art, such as, for example, hydrolysis of ethyl orthosilicate, acidification of an alkali metal silicate and a salt of a metal, the oxide of which it is desired to cogel with silica, etc. The relative proportions of finely divided crystalline aluminosilicate and inorganic oxide gel matrix may vary widely with the crystalline aluminosilicate content, ranging from about 2 to about 90 percent by weight and more usually, particularly where the composite is prepared in the form of beads, in the range of about 5 to about 50 percent by weight of the composite.

Not only may the clays, silica-alumina gels, and the like, mentioned above, be used as matrix materials to make a composite catalyst particle, but they may also be used in the form of particles in admixture with catalyst particles as hereinafter noted.

The superactive aluminosilicate materials, as initially prepared by base-exchange to give substantial replacement of sodium cation by rare-earth metal cations, hydrogen, etc., are extremely active. So much so, in fact, that, when subjected to the well-known CAT–A test (National Petroleum News, 36, p. R–537, Aug. 2, 1944), in which the catalyst is exposed to a specified gas oil at 800° F., LHSV (liquid hourly space velocity) of 1.5 for 10 minutes, the hydrocarbon is quite substantially converted to gas and coke, with little gasoline. This would apparently condemn such catalysts for use in commercial processes to which the CAT–A test is related. To measure the actual activity of these catalysts, a simple test method has been devised, wherein the ability of these catalysts for cracking hexane, relative to the ability of a specified conventional amorphous silica-alumina catalyst for cracking hexane, may be measured.

This test is described in detail in application Ser. No. 208,512, filed July 9, 1962, now abandoned.

According to the results of this test, the relative cracking ability of these catalysts, referred to as alpha, is compared with a conventional amorphous silica-alumina catalyst having an activity of 46 AI by the CAT–A test. This conventional silica-alumina catalyst, assigned an alpha value of 1.0, will give 13.0% conversion of normal hexane, at 1000° F., using 1.5 cc. of catalyst, 30–60 mesh, exposed to reactant at a gaseous flow rate of 10 cc. per minute of helium saturated with vapors of n-hexane at room temperature and pressure, instantaneous conversion being measured at the fifth minute of on-stream time.

By this method of evaluation, the freshly prepared base-exchanged or hydrogen-form aluminosilicates will be found to have alpha values of the order of 1000 and above, thus explaining their behavior in the CAT–A test. This activity may be reduced in several ways—by steaming at 1200° F. for 24 hours, by heating at 1300–1400° F. in atmospheric air for similar periods, by change of the nature of the cations in the compound, and the like. These treatments may be more rigorous or less rigorous, times as active for the cracking of hexane as is silica-alumina catalyst of 46 AI (CAT–A); in other words, such steamed catalysts have an alpha of about 10.

DESCRIPTION OF PREFERRED EMBODIMENTS

Example I

In the following runs of Example I, an aluminosilicate catalyst which was a composite of 10% by weight of an X-type faujasite which had been base-exchanged with rare earth to a high degree of removal of sodium and composited, 10% (wt. percent) of aluminosilicate, 90% (wt. percent) of amorphous silica-alumina, in bear form was utilized. This catalyst had been treated with steam to reduce the activity of the aluminosilicate material to about 10 alpha. This catalyst was cyclically contacted at the atmospheres indicated with such hydration and dehydration media as might be found in commercial processes. At specified points in the cycle treatments, the catalyst was tested in a standard activity test known as CAT–C. In the CAT–C method, the catalyst is used to crack a mid-continent gas oil having a boiling range of 450° F. to 950° F. to gasoline having an end point of 410° F. by passing vapors of said gas oil through the catalyst at 900° F., substantially atmospheric pressure and a feed rate of 1.5 volumes of liquid oil per volume of catalyst per hour for 10 minutes.

TABLE 1

| Run No. | Treatment Hyd. | Treatment Dehyd. | No. of cycles aged | Catalyst properties Surf. area m.²/g. | Rel. cryst. percent | Conv. percent vol. | Gasoline $C_5+$ Percent vol. | Gasoline $C_5+$ Δ | Gasoline $C_4$ Percent vol. | Gasoline $C_4$ Δ | Dry gas Percent vol. | Dry gas Δ | Coke Percent vol. | Coke Δ |
|---|---|---|---|---|---|---|---|---|---|---|---|---|---|---|
| | | | Start | 213 | 2.8 | 55.8 | 44.9 | +4.6 | 12.8 | −2.0 | 5.7 | −1.6 | 2.4 | −1.4 |
| 1 (Base) | 100% Steam | 100% Air | 202 | 154 | 1.5 | 47.7 | 38.6 | +3.2 | 11.0 | −0.9 | 5.0 | −1.1 | 1.8 | −1.0 |
| | | | 476 | 132 | 1.1 | 37.6 | 31.2 | +1.8 | 7.9 | −0.7 | 3.9 | −0.7 | 1.4 | −0.4 |
| | | | 838 | | 0.7 | 30.2 | 24.8 | | 6.2 | | 3.4 | | 1.2 | |
| 2 | 50:50 Steam:Air | 100% Air | 202 | 179 | 2.2 | 53.8 | 43.5 | +4.4 | 12.6 | −1.4 | 5.4 | −1.5 | 2.0 | −1.5 |
| | | | 476 | 175 | 1.9 | 50.9 | 43.6 | +6.3 | 10.8 | −2.2 | 4.1 | −2.4 | 1.9 | −1.2 |
| | | | 838 | 158 | 1.5 | 50.6 | 42.3 | +5.1 | 10.8 | −2.1 | 4.9 | −1.6 | 1.8 | −1.3 |
| 3 | 100% Air | 100% Air | 202 | 206 | 2.6 | 54.9 | 43.6 | +3.9 | 13.4 | −1.0 | 5.7 | −1.4 | 2.3 | −1.3 |
| | | | 476 | 193 | 2.4 | 55.0 | 44.6 | +4.2 | 12.2 | −2.2 | 5.5 | −1.6 | 2.3 | −1.4 |
| | | | 838 | 200 | 2.5 | 55.6 | 44.9 | +4.7 | 12.5 | −2.1 | 5.7 | −1.5 | 2.3 | −1.4 |
| 4 | 100% Steam | 25:75 Steam:Air | 202 | 169 | 2.2 | 56.2 | 45.7 | +5.2 | 12.9 | −1.9 | 5.6 | −1.7 | 1.9 | −1.9 |
| | | | 476 | 152 | 2.5 | 55.4 | 46.4 | +6.4 | 11.8 | −2.7 | 5.3 | −1.9 | 1.6 | −2.1 |
| | | | 838 | 144 | 2.2 | 52.4 | 44.2 | +6.0 | 10.6 | −2.9 | 4.9 | −1.8 | 1.8 | −1.5 |

NOTE: The moisture in the air used was estimated to be 0.4% vol. Δ values indicate differential over standard silica alumina catalyst at same conversion level.

dependent upon the extent of activity reduction required. Compositing the catalyst, of original or of reduced activity with a matrix of less or little activity, also serves to control the activity, as does using a physical mix of particles of the catalyst and of a material of less or little activity. (The last two may not lessen the actual activity of the catalyst, but effect about the same end by dilution of its exposure to reactant.)

One method of handling the freshly prepared materials of high activity is to treat with steam at atmospheric pressure up to about 15 p.s.i.g. for 24 hours at 1200° F. Such treatment will produce a catalyst which is about 10

Example II

Following the same general procedure and using the same conditions described in Example I, the base run was repeated with the composite catalyst and additional runs were conducted in which smaller amounts of steam were injected into the air used in the dehydration phase to prevent deactivation of the catalyst. Also, another run was conducted under base conditions with another composite catalyst containing about 7 percent by weight of a precalcined rare earth exchanged Y-type faujasite in a silica-alumina gel matrix. The results of these runs are given in Table 2 below.

TABLE 2

| Run No. | Treatment Hyd. | Treatment Dehyd. | No. of cycles aged | Catalyst properties Surf. area m.²/g. | Catalyst properties Rel. cryst. percent | Catalyst properties Conv. percent vol. | Gasoline C₅+ Percent vol. | Gasoline C₅+ Δ | Gasoline C₄ Percent vol. | Gasoline C₄ Δ | Dry gas Percent vol. | Dry gas Δ | Coke Percent vol. | Coke Δ |
|---|---|---|---|---|---|---|---|---|---|---|---|---|---|---|
| Catalyst A¹ | | | Start | 213 | 2.8 | 55.8 | 44.9 | +4.6 | 12.8 | −2.0 | 5.7 | −1.6 | 2.4 | −1.4 |
| 5 (Base) | 100% Steam | 100% Air | 310 | 146 | 1.2 | 44.5 | 37.2 | +3.7 | 9.1 | −1.8 | 4.4 | −1.2 | 1.7 | −0.7 |
|  |  |  | 514 | 138 | 1.4 | 39.1 | 32.9 | +2.5 | 7.7 | −1.4 | 3.9 | −1.0 | 1.7 | −0.2 |
| 6 | 100% Steam | 5:95 Steam:Air | 310 | 181 | 2.0 | 54.3 | 46.0 | +6.6 | 11.1 | −3.2 | 4.9 | −2.1 | 2.0 | −1.6 |
|  |  |  | 514 | 175 | 2.0 | 52.6 | 44.3 | +5.9 | 11.0 | −2.8 | 4.9 | −1.9 | 1.8 | −1.6 |
| 7 | 100% Steam | 10:90 Steam:Air | 310 | 145 | 1.8 | 52.8 | 44.5 | +6.0 | 10.8 | −2.8 | 4.9 | −1.9 | 1.7 | −1.7 |
|  |  |  | 514 | 145 | 2.2 | 51.7 | 43.9 | +6.1 | 10.8 | −2.7 | 4.7 | −1.9 | 1.7 | −1.5 |
| Catalyst B² | | | Start | 120 | 2.2 | 55.1 | 46.5 | +6.7 | 11.1 | −3.6 | 5.0 | −2.2 | 1.9 | −1.8 |
| 8 | 100% Steam | 100% Air | 310 | 98 | 2.1 | 51.4 | 44.3 | +6.7 | 9.7 | −3.5 | 4.5 | −2.1 | 1.8 | −1.4 |
|  |  |  | 514 | 100 | 2.4 | 48.7 | 40.6 | +4.2 | 10.2 | −2.3 | 4.7 | −1.5 | 1.8 | −1.1 |

¹ Composite containing 10% REX in silica-alumina gel matrix.
² Composite containing 7% precalcined REY in silica-alumina gel matrix.
NOTE: The moisture in the air is estimated to be 0.4% vol.

Examination of the data from Examples I and II shows that about 80 percent of the loss of activity was prevented by using a 50:50 dry gas-steam mixture in the steam part of the cycle, or by adding 25 percent steam to the air in the dehydration part of the cycle. Also, injection of 5 percent or 10 percent steam into the dehydration part of the cycle substantially reduced deactivation of the catalyst.

In addition, it will also be noted that the selectivity of the catalysts for gasoline production was enhanced when the steam was injected into the air cycle.

Furthermore, these data also show that different aluminosilicate catalysts such as Catalyst A and Catalyst B are deactivated to different extents under the same conditions. From the above it will be noted that the exact conditions and contents of moisture in the atmosphere in the various phases of a cyclic process where hydration and dehydration may occur are dependent upon the catalyst being used.

BRIEF DESCRIPTION OF DRAWINGS

The first three figures of the drawing recapitulate the data in graphical form. FIGURE 1 shows changes in conversion ability. FIGURE 2 shows changes in "relative crystallinity" (a measure of the relative amount of aluminosilicate ingredient). FIGURE 3 shows changes in surface area of the composite catalyst.

In FIGURES 1, 2 and 3, Curve A (designated in FIGURE 4), with dry air in both portions of the cycle, consequently maintaining a relatively dehydrated catalyst, shows little change.

In FIGURES 1 and 2, Curve B (designated in FIGURE 4) with some steam admitted to the dehydration phase, shows little change in either conversion or relative crystallinity, although a drop in surface area is noted in FIGURE 3.

In all the first three figures, Curve C (designated in FIGURE 4) where air was admitted to the hydration phase, maintenance of properties, particularly for conversion (FIGURE 1) was good.

In all the first three figures, Curve D (designated in FIGURE 4), where hydration was alternated, with dehydration without attempt at correction, loss of conversion ability, as well as other properties, was very marked.

It will be appreciated that the examples set forth above, as well as the foregoing specification, are merely illustrative of the process of this invention and that other aluminosilicate catalysts and catalyst processes may be treated by the process of this invention.

It will be further appreciated that various modifications and alterations may be made in the process without departing from the spirit of the invention.

What is claimed is:

1. A process for preventing the deactivation of a crystalline aluminosilicate catalyst resulting from cyclic hydration and dehydration in different stages of a catalytic process which comprises maintaining the moisture content of different atmospheres that contact the catalyst in the different stages of a catalytic process to minimize fluctuations in the hydration and dehydration states of the catalyst.

2. The process of claim 1 in which moisture is injected into a stage having an atmosphere that causes dehydration of the aluminosilicate catalyst.

3. The process of claim 1 in which from about 0.05 to about 0.30 atmospheres of steam is maintained in the atmosphere which causes dehydration of the catalyst.

4. The process of claim 1 in which gas substantially free of moisture is used to replace at least a portion of an atmosphere in a stage that causes hydration of the catalyst.

5. The process of claim 1 in which the aluminosilicate catalyst is one having cation sites selected from a group consisting of exchangeable polyvalent metals, hydrogen, compounds convertable to hydrogen and mixtures thereof.

6. The process of claim 1 in which said aluminosilicate catalyst is selected from the group consisting of faujasite and isomorphs thereof.

7. The process of claim 1 in which said aluminosilicate catalyst is a rare earth exchanged faujasite.

8. The process of claim 1 in which said aluminosilicate is a rare earth ammonium exchanged faujastite.

9. A process for preventing the deactivation of a crystalline aluminosilicate catalyst caused by cyclic contact with hydrating and dehydrating atmospheres during a catalytic process which comprises maintaining the catalyst in a state of relative uniform hydration by injecting moisture into those atmospheres that cause dehydration of the catalyst.

10. The process of claim 1 in which at least 0.05 atmospheres of steam is present in the dehydrating atmospheres.

References Cited

UNITED STATES PATENTS 2,631,123  3/1953  Kaulakis _____ 196—52
2,909,580  10/1959  Layng _____ 260—683.15
3,071,538  1/1963  Lawson _____ 208—420
3,281,356  8/1965  Kress et al. _____ 252—455

PATRICK P. GARVIN, *Primary Examiner.*

C. F. DEES, *Assistant Examiner.*